United States Patent [19]
>
> Henry et al.

[11] Patent Number: 4,543,712

[45] Date of Patent: Oct. 1, 1985

[54] PROCESS FOR ASSEMBLING A CLAD BUSBAR OF AN ELECTRICAL INSTALLATION

[75] Inventors: Georges Henry, St. Martin le Vinoux; Jean Kieffer, Brignoud, both of France

[73] Assignee: Merlin Gerin, Grenoble, France

[21] Appl. No.: 584,449

[22] Filed: Feb. 28, 1984

[30] Foreign Application Priority Data

Mar. 7, 1983 [FR] France ................... 83 03810

[51] Int. Cl.⁴ ............................................ H01R 43/00
[52] U.S. Cl. ..................................... 29/825; 174/99 B
[58] Field of Search ................. 29/825, 828, 433, 234; 174/28, 21 C; 138/113, 114; 206/446; 414/745

[56] References Cited

U.S. PATENT DOCUMENTS 3,573,342  2/1971  Graybill .
3,814,830  6/1974  Cronin et al. .
4,253,792  3/1981  Nishikawa ............................ 414/589
4,296,271 10/1981  Floessel .............................. 29/828 X
4,296,273 10/1981  Hologa et al. ..................... 174/99 B

FOREIGN PATENT DOCUMENTS 1285044 12/1968  Fed. Rep. of Germany .
1049863  1/1954  France .............................. 174/99 B
2152837  4/1973  France .

Primary Examiner—Howard N. Goldberg
Assistant Examiner—Carl J. Arbes
Attorney, Agent, or Firm—Parkhurst & Oliff

[57] ABSTRACT

The present invention relates to an insulated high voltage transmission line and method for pre-assembling in the factory the sections of this line. The busbar is inserted into the cylindrical outer metal casing and held inside the casing by a removable support. On the job site, the removable support is withdrawn from the casing and the sections are connected in the usual manner. Support tools are used to avoid the bar overhanging during pre-assembling in the factory or assembling of the sections on the job site. During shipping the bar is inserted into the metal casing.

7 Claims, 15 Drawing Figures

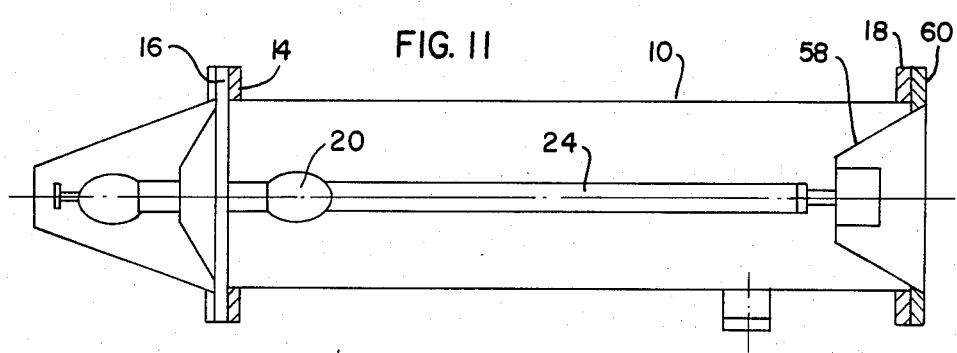
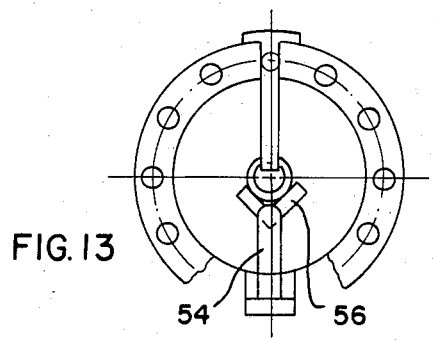
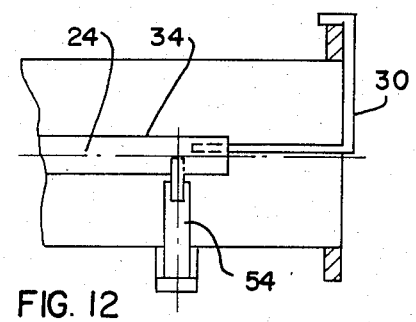
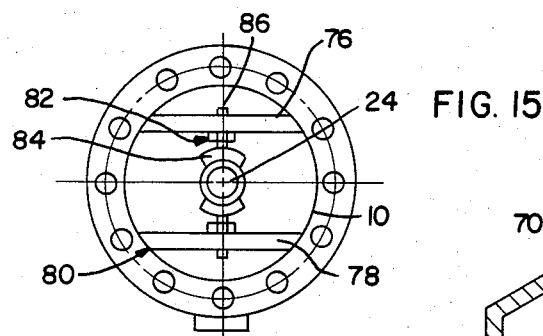
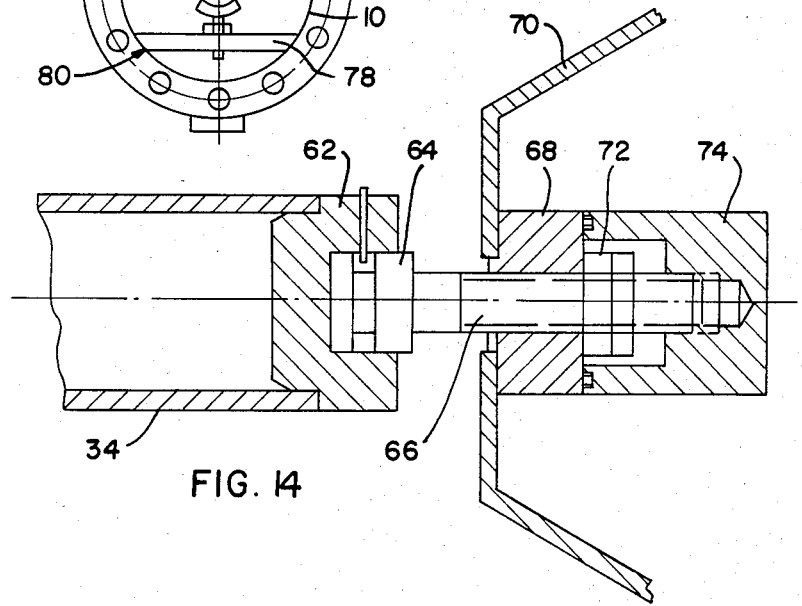

PROCESS FOR ASSEMBLING A CLAD BUSBAR OF AN ELECTRICAL INSTALLATION

BACKGROUND OF THE INVENTION

The invention relates to a busbar assembly process of a high-voltage metal-clad electrical installation, subdivided into modular sections each comprising a conductor bar coaxially supported inside a tubular cladding enclosure by a support insulator.

The busbar length in a metal-clad electrical installation, and in particular a metal-clad high-voltage unit, can vary from a few feet to a hundred feet or even more, and modular systems are regularly called upon to reduce manufacturing and fitting costs. Busbar assembly is carried out on the job site itself, which means that the component elements, in this case the support insulators, enclosures or cladding and conductor bars, have to be packed separately. This assembly of elements of considerable length, for example twenty feet, requires special care, particularly as far as cleanliness is concerned, which is difficult to achieve on the job site. Individual packing and shipping of the various elements gives rise to considerable expenses and the aim of the present invention is to remedy these drawbacks and to enable pre-assembly of a modular section to take place in the factory.

SUMMARY OF THE INVENTION

The assembly process according to the invention is characterized by the fact that each secton is pre-assembled in the factory, the support insulator crossed by the conductor bar being fastened to one of the ends of the enclosure and the overhanging bar inside the enclosure being fixed close to its free end to a removable support bearing on the enclosure, and that the various modular sections are connected on the job site, the removable support being withdrawn.

Factory pre-assembly of the conductor bar inside the enclosure obviously makes on site fitting of the bars and shipping of these sections easier. However, any damage during shipping must be provided at all costs, and to this end the bar must be firmly secured inside the enclosure. According to the present invention, one of the ends of the bar is secured by the conventional disc or cone-shaped insulator fixed to one of the enclosure flanges. This insulator will, after fitting of the adjacent section, serve as support for the bar end of the following section. The free end of the bar is held in place during shipping by a removable support fitted in the factory and removed on the job site. The overhanging length, which is greater than the length of the bar, needs to be temporarily held fast during fitting and removal of the removable support, in order to avoid the support insulator or the bar subjected to a lever breaking.

According to one implementation of the invention, the support insulator is crossed by a busbar section having a draw-in contact at each end, on both sides of the insulator. The bar is inserted into the enclosure or cladding in the factory by means of a support carriage which rolls on the enclosure so as to draw the end of the bar into the contact fixed to the support insulator. Once a tool has been fitted to support the overhanging end of the bar, the carriage can be removed from the enclosure and replaced by a removable support wedged between the bar and the enclosure. The bar is preferably rigidly secured to the removable support, in order to avoid any relative movement in the event of the packaging being overturned or receiving an impact during shipping. On site assembly does not give rise to any special problems provided care is taken never to leave the free end of the bar overhanging. During shipping, the enclosure is advantageously sealed tight by means of an end plate fitted onto the enclosure flange, the whole assembly being filled with low pressure gas. In this way, no dust particles can enter the enclosure.

According to another implementation of the invention, the overhanging end of the bar is supported during shipping by a removable support firmly secured to an enclosure end sealing plate fixed to the enclosure flange. Support tools are again used to avoid the bar overhanging during fitting or removal of the removable support.

The invention also relates to an implementation device of the above-mentioned process, and in particular to a lateral collar on the enclosure in the region of the conductor bar end enabling a support tool, and if need be a tie fixing the bar to a removable support, to be fitted.

BRIEF DESCRIPTION OF THE DRAWINGS

Other advantages and characteristics will become more apparent from the description that follows of three modes of implementation given as non-exhaustive examples and represented in the accompanying drawings, in which:

FIG. 11 is a similar view to that of FIG. 6, illustrating another embodiment of the invention;

FIGS. 12 and 13 are similar views to FIGS. 8 and 9, showing the section according to FIG. 11, after the removable support has been removed;

FIG. 14 is an enlarged-scale view of the removable support represented in FIG. 11; and FIG. 15 is a similar view to that of FIG. 7, showing another embodiment.

DESCRIPTION OF THE PREFERRED EMBODIMENT

Figure 1:
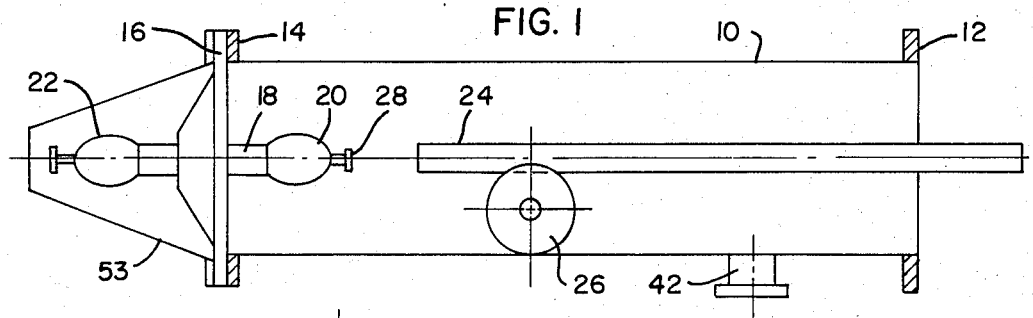
FIG. 1 is a cross-sectional view of a bar section represented during insertion of the bar into the enclosure.

In the figures, a cylindrical enclosure or metal cladding 10 is fitted with fixing flanges 12, 14 at its ends. A disc or cone-shaped support insulator 16 crossed by a conductor bar section 18 is fixed to flange 14 in the factory be screws or bolts (not shown). Section 18 has at both ends draw-in contacts 20, 22 well-known to specialists, able to accommodate the end of a conductor bar 24 on draw-in. In the example illustrated in the figures, the sum of the bar 24 and section 18 lengths is equal to the enclosure 10 length, which can be several feet, for example twenty. By assembling several modular sections, busbars of great length can be produced, bar 24 being rigidly secured by support insulators 16 wedged between flanges 12, 14 of the successive sections. Enclosure 10 is filled with a high dielectric strength gas, in particular sulphur hexafluoride, tightness being ensured by the support insulators 16.

Figure 6:
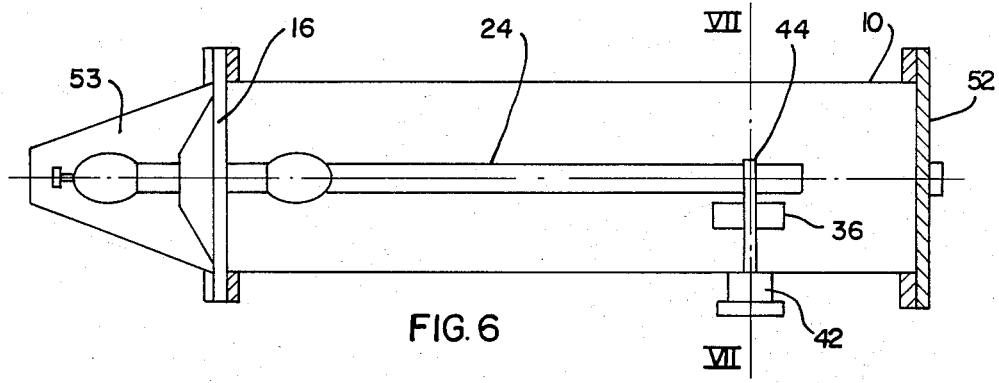
FIG. 6 is a similar view of that of FIG. 1, showing the modular section ready for shipping.
Figure 7:
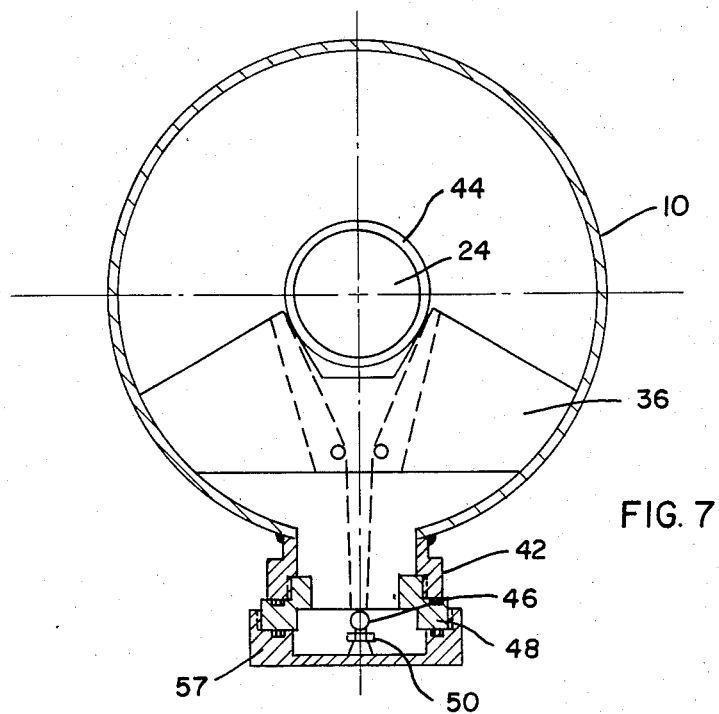
FIG. 7 is an enlarged-scale cross-sectional view along the line VII—VII of FIG. 6.
Figure 9:
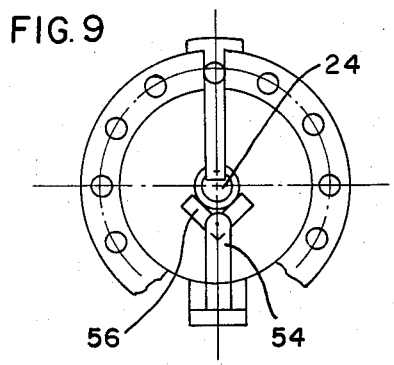
FIG. 9 is a right-hand view of FIG. 8.
Figure 8:
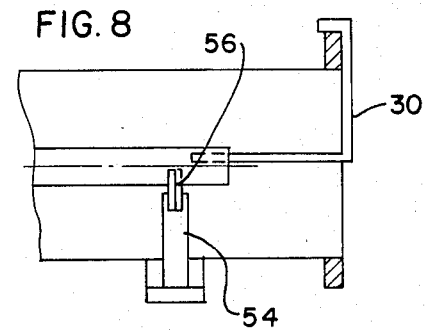
FIG. 8 is a similar view to that of FIG. 2, illustrating fitting of a support tool.

According to the present invention, assembly of the modular section is carried out in the factory, which makes for ease of respecting conditions of cleanliness and accuracy in fitting. Having first fixed support insulator 16 onto flange 14, bar 24 is inserted into enclosure 10 supported by one or several carriages rolling on the bottom of enclosure 10. When bar 24 insertion is complete, the tubular end of the latter engages on a centering finger 28 guiding bar 24 for engagement on contact 20. In this drawn-in position, bar 24 is held on the one hand by draw-in contact 20 with guiding finger 28, and on the other hand by carriage(s) 26. Before carriages 26 are removed, a hook-shaped support tool 30 is positioned, one end of which latches onto or is fixed to flange 12 and the opposite end 32 of which is inserted into the tubular end 34 of bar 24. Bar 24 being supported by hook 30, carriage(s) 26 can be removed to be replaced by a plinth-shaped removable support 36 inserted via the open end of enclosure 10 between bar 24 and the bottom of enclosure 10. Removable support 36 has a V-shaped notch 38 on its upper face to support and center bar 24, as well as bearing faces 40 which rest against the internal circumference of enclosure 10. The height of support or plinth 36 corresponds of course to the radius of enclosure 10 in order to center bar 24 correctly. Removable support 36 is placed at the level of a collar 42 located on the bottom of enclosure 10 near the end 34 of bar 24. Referring more particularly to FIGS. 6 and 7, it can be seen that collar 42 enables a flexible fixing tie 44 to be placed, passing through appropriate holes in removable support 36 and encompassing bar 24. The two ends of flexible tie 44 are passed round a stud 46 supported by a bush 48 screwed onto collar 42. After tie 44 has been tightened, the two ends are fastened together with a clip or by any other suitable means. It can easily be seen that flexible tie 44 holds bar 24 resting on removable support 36, the latter being held fast by enclosure 10 wall. When flexible tie 44 has been fitted or even prior to fitting, hook 30 is removed and replaced by an end plate 52 tightly sealing the end of enclosure 10. A protective cover 53 is fitted over support insulator 16 and a plug 57 seals collar 42, producing a tight enclosure advantageously filled with gas at a slight overpressure to avoid dust or any other impurities getting into the enclosure. The modular assembly ready for packing and shipping is represented in FIG. 6, and it can easily be seen that bar 24 is held fast inside enclosure 10 without any risk of damage to support insulator 16.

Figure 10:
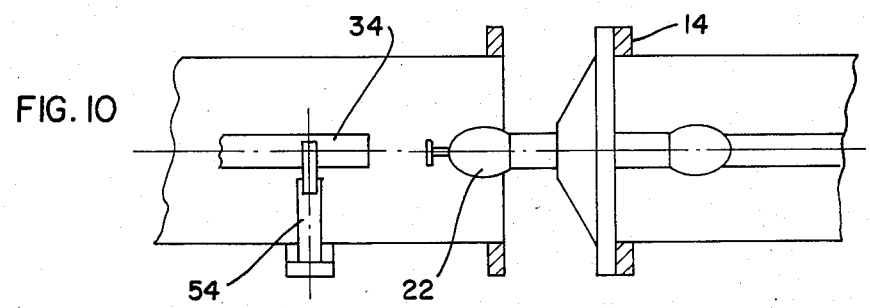
FIG. 10 is a cross-sectional view showing assembly of two successive sections.

On site assembly of two successive modules is carried out quite simply be removing end plate 52 and fitting tool or hook 30 enabling tie 44 to be removed and removable support 36 to be withdrawn from enclosure 10. A support tool 54 terminated by a folding-tooth V-shaped fork 56 encompassing the outer circumference of bar 24 is inserted in a well-known way via collar 42. Tool 54 is fixed to collar 42 by any suitable means so as to constitute a rigid support for bar 24 enabling support hook 30 to be withdrawn and removed. The two successive sections can then be brought together as shown in FIG. 10, until bar end 34 is drawn into contact 22 of the following element. When flanges 12,14 have been drawn in and secured by screws or bolts, tool 54 can be removed via collar 42, fingers 56 folding back, and a sealing plug 57 is placed over collar 42.

It can easily be seen that the tools to implement the process according to the invention are particularly simple and that the time enclosure 10 is exposed to the air can be very short, limited to the time taken to connect two successive sections up. Component part cleaning operations can be performed in the factory, on site assembly being carried out in a limited area and in a particularly simple fashion.

The successive operations described in the foregoing account can be summed up making a distinction between the operations carried out in the factory and those performed on the job site. In the factory, after the various component parts have been cleaned, support insulator 16 and protective cover 53 are fastened to enclosure 10 flange 14. Bar 24 is inserted by means of carriages 26 until it is drawn into contact 20. A tool 30 resting on flange 12 is drawn into bar 24 overhanging end before carriages 26 are withdrawn. Removable support 36 is inserted between bar 24 and enclosure 10 and flexible tie 44 inserted via collar 42 is tightly secured around stud 46 to hold bar 24, removable support 36 and enclosure 10 firmly together. When tool 30 has been removed, end plate 52 fitted, and enclosure 10 filled with compressed gas, collar 42 is sealed off by plug 57 and the whole assembly is packed in the usual fashion.

On the job site, after the modular element has been unpacked, end plate 52 is removed to enable support tool 30 to be fitted. Tie 44 is cut and removable support 36 withdrawn through enclosure 10 opening. Plug 57 will of course have been removed beforehand to give access to tie 44. A tool 54 is inserted through the unsealed opening in collar 42 to support the end of bar 24 and enable tool 30 to be removed. The two modular elements can then be connected, the end of the bar being drawn into contact 22. After flanges 12, 14 have been tightened and tool 54 removed, the usual operations of creating a vacuum and filling with high dielectric strength gas are carried out.

Figure 3:
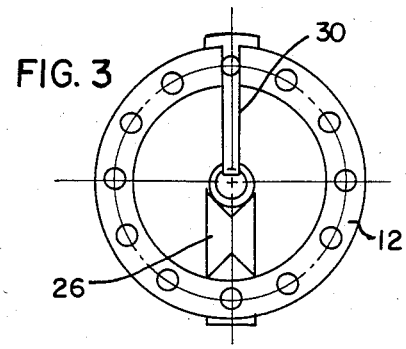
FIG. 3 is a right-hand view of FIG. 2.
Figure 2:
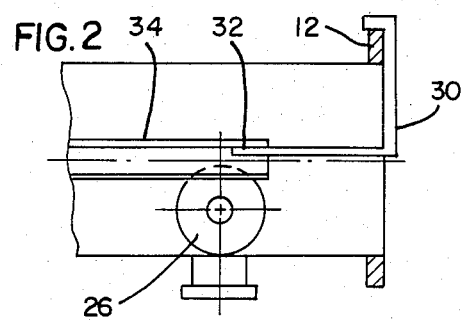
FIG. 2 is a partial view of FIG. 1, showing the tool supporting the end of the bar and the support carriage retraction operation.
Figure 5:
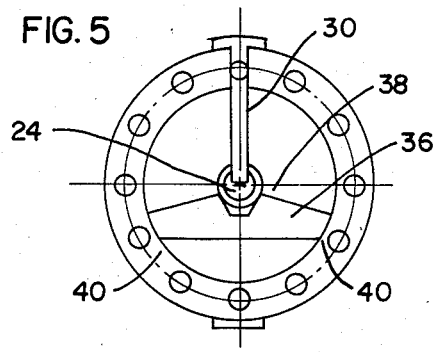
FIG. 5 is a right-hand view of FIG. 4.
Figure 4:
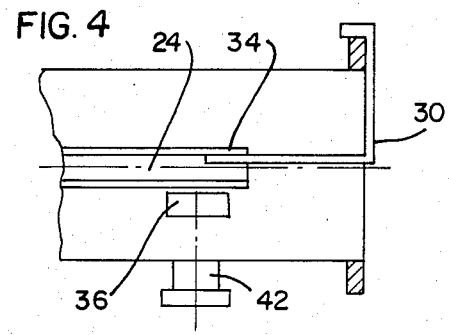
FIG. 4 is a similar view to that of FIG. 2, showing the removable support fitting.

It is clear that the support tools as well as the removable support can be designed differently and two different modes of implementation are described hereafter as examples. According to the first implementation, the removable support is firmly secured to a base that can be fixed to flange 12. The operations for fitting bar 24 inside enclosure 10, illustrated in FIGS. 1 to 3, are exactly identical and will not be described again. After removal of carriage(s) 26, a folding fork 56 tool 54 is inserted via collar 42 to support bar 24 end 34 and to enable hook-shaped tool 30 to be removed (FIGS. 12 and 13). The removable tool, designated by the general reference 58, has a flange 60 which can be fixed by bolts or screws to enclosure 10 flange 14, as well as centering and support finger 62 fitting into bar 24 end 34. Referring particularly to FIG. 14, it can be seen that support finger 62 is fixed to and can move on a threaded rod 66 head 64 screwed into a nut 68 attached to a cone 70 held by flange 60. Threaded rod 66 acts as an extension to bar 24, and it can be clearly seen that a rotation of this rod 66 corresponding to an unscrewing movement enables finger 62 to be drawn away from the end of enclosure 10 and bar 24 to be compressed. Screwing in the opposite direction enables centering finger 62 to be withdrawn. The height of removable tool 58, and particularly the height of cone 70, and the length of threaded rod 66, corresponds of course to the clearance between bar 24 end 34 and flange 12. Removable support 58 is disposed as a tight sealing plate on enclosure 10. After removable tool 58 has been fitted and bar 24 tightened if need be by rotating threaded rod 66, bar 24 is firmly secured and held inside enclosure 10 to enable it to be packed and shipped. Tool 54 can be kept in place or removed so that enclosure 10 can be filled with gas. Tool 30 is superfluous if tool 54 can be fitted before carriage 26 is completely withdrawn.

On the job site, it is sufficient to refit tool 54 and withdraw removable support 58 to enable two successive sections to be assembled as described above and shown in FIG. 10. Once removable support 58 has been fitted, threaded rod 66 can be secured by a nut 72, the protruding part of rod 66 being advantageously covered by a cap 74.

Removable support 58 offers the advantage of symmetry and of being able to place bar 24 is compression avoiding withdrawal or retraction of contact 20. The same removable support 58 can be used to hold a bar whose end 34 protrudes beyond flange 12, cone 70 being in this case fitted towards the outside by simply turning support 58 round. Threaded rod 66 is of course also screwed the other side so as to guide centering finger 62 in the direction of bar 24.

FIG. 15 shows another embodiment of the removable support made up of two wedges 76, 78 lodged between bar 24 and enclosure 10. Each wedge is in the form of a cross-bar, its ends 80 bearing on the internal face of enclosure 10, and having in the middle a clamping jaw 82 constituted by a grip 84 secured to cross-bar 76, 78 by a perpendicular threaded rod 86. A nut screwed onto rod 86 enables grip 84 to be clamped onto bar 24.

Wedges 76, 78 are inserted via the end of enclosure 10 and the nuts are symmetrically tightened from outside to position and wedge bar 24 in the center of enclosure 10. The rounded shape of grip 84 prevents any lateral movement of the bar.

What we claim is:

1. A busbar assembly process for a high voltage metal clad electrical installation having sub-divided modular sections, each modular section having a tubular metal cladding enclosure fitted with fixing flanges at the ends, a conductor bar coaxially fitted inside the enclosure, and a support insulator fixed to one of said flanges and supporting said bar at one of its ends, said method comprising the steps of:

pre-assembling each section at an off-site location by inserting the bar into the enclosure, the bar being supported by a carriage; fixing one end of the bar to the support insulator fastened to one of the ends of the enclosure; temporarily supporting the opposite overhanging end of the bar by a temporary supporting tool; withdrawing the carriage from a free end of the enclosure; and fitting the overhanging end of the bar on a removable support which bears on the enclosure; and shipping the assembly to an on-site location and withdrawing the removable support from the enclosure before connecting the section to an adjacent section.

2. The process of claim 1, wherein the temporary supporting tool in removed after the removable support has been fitted on the overhanging end of the bar, the temporary supporting tool being refitted onto the overhanging end before the removable support is removed at the on-site location.

3. The process of claim 1, wherein the temporary supporting tool is inserted through a lateral collar of the enclosure located to the overhanging end of the bar to support the overhanging end of the bar.

4. The process of claim 3, wherein the step of fitting the overhanging end of the bar on the removable support includes inserting a plinth between the bar and the enclosure on a side of the enclosure adjacent the lateral collar, and fixing the bar with a tie for holding the bar against the plinth.

5. The process of claim 3, wherein the step of fitting the overhanging end of the bar on the removable support includes drawing the bar onto a finger joined to a fixing base located at the free end of the enclosure.

6. The process of claim 5, wherein the bar tightly seals the enclosure.

7. The process of claim 3, wherein the step of fitting the overhanging end of the bar to the removable support includes fitting two wedges between the bar and the enclosure, each wedge having a jaw for clamping the bar.

* * * * *